United States Patent [19]

Berry

[11] Patent Number: 5,553,227

[45] Date of Patent: Sep. 3, 1996

[54] METHOD AND SYSTEM FOR VISUALLY PROGRAMMING STATE INFORMATION USING A VISUAL SWITCH

[75] Inventor: Richard E. Berry, Georgetown, Tex.

[73] Assignee: International Business Machines Corporation, Armonk, N.Y.

[21] Appl. No.: 296,783

[22] Filed: Aug. 26, 1994

[51] Int. Cl.$^6$ .................................................. G06F 3/14
[52] U.S. Cl. ............................................................. 395/161
[58] Field of Search ........................... 395/155, 156, 395/157, 158, 159, 160, 161, 800; 364/401, 408; 345/169

[56] References Cited

U.S. PATENT DOCUMENTS

| | | | |
|---|---|---|---|
| 4,177,514 | 11/1979 | Rupp | 395/800 |
| 4,298,865 | 11/1981 | Masuzawa et al. | 345/169 |
| 4,611,306 | 9/1986 | Crehan et al. | 364/900 |
| 4,680,705 | 7/1987 | Shu | 364/300 |
| 4,692,858 | 9/1987 | Redford et al. | 364/200 |
| 5,206,950 | 4/1993 | Geary et al. | 395/600 |
| 5,233,513 | 8/1993 | Doyle | 364/401 |
| 5,247,651 | 9/1993 | Clarisse | 395/500 |
| 5,261,079 | 11/1993 | Celi, Jr. | 395/500 |

FOREIGN PATENT DOCUMENTS

0240920A2  10/1987  European Pat. Off. .
WO91/20033  12/1991  WIPO .

OTHER PUBLICATIONS

"Visual Clues for Object–Oriented Visual Programming Syntax", Research Disclosure, Nov. 1992, No. 343.
"Default Organization for Connected Objects", Research Disclosure, May 1993, No. 283.

*Primary Examiner*—Mark R. Powell
*Assistant Examiner*—Ruay Lian Ho
*Attorney, Agent, or Firm*—Diana L. Roberts

[57] ABSTRACT

A method and system for visually programming state information using a visual switch. The visual switch has at least one first input, a plurality of second inputs, and at least one output. The method includes the steps of displaying the visual switch on a display and visually connecting the output to a selected one of the second inputs in response to the first input. The method includes the computer-implemented steps of displaying the first and second inputs on a display, visually linking information to at least one of the second inputs, and visually linking a value to one of the first inputs to set the visual switch object, thereby selectively connecting the information from one of the second inputs to the output.

14 Claims, 3 Drawing Sheets

METHOD AND SYSTEM FOR VISUALLY PROGRAMMING STATE INFORMATION USING A VISUAL SWITCH

BACKGROUND OF THE INVENTION

1. Field of the Invention

The present invention relates to visual programming tools and, more particularly, to a user interface technique that enables visual programming of state information using a visual switch object.

2. Background Information and Description of the Related Art

Visual programming tools are becoming very popular because they allow non-programmers to create useful computer applications without resorting to traditional programming languages. However, many abstract functions used in traditional programming languages are still necessary for certain applications and, therefore, require visual representations for non-programmers. The state of the program is one such abstract function.

For example, consider programming a simple four function calculator that provides plus, minus, times, and divide operations. The action taken on the press of any key (e.g. digit, operator, decimal, clear, etc.) depends on the type of key last pressed. Programming languages typically perform such actions by first establishing variables for holding flags or the value of the keys themselves. These variables control decision statements that choose the correct action to perform for the current key press. As such, the variables preserve the "state" of the program.

Some conventional visual programming tools, such as Microsoft's VisualBasic™, require that such decisions be coded using programming language statements. The Digitalk PARTS™ Visual Builder permits users to create visual variables using programming language statements and then connect, or link, those variables to build an application. However, both of these approaches require the user to have a programming mentality that involves recognizing the need to create a variable that holds the state information and then specifying tests on that variable to determine the next step. Typical non-programming users are not trained in such concepts and are not likely to devise them on their own.

Accordingly, there is a need for a visual programming tool that enables a user to visually program state information using a visual switch object.

SUMMARY

It is an object of the present invention to provide a method and system for visually programming information using a visual switch object. The visual switch object has at least one first input, a plurality of second inputs, and at least one output. The method includes the steps of displaying the visual switch on a display and visually connecting the output of the visual switch to a selected one of the second inputs in response to the first input.

The system for visually programming information on a display includes a display and a visual switch that is displayed on the display. The visual switch includes at least one first input, a plurality of second inputs, and means for visually connecting the output to a selected one of the second inputs in response to the first input.

DETAILED DESCRIPTION OF THE PREFERRED EMBODIMENT

Figure 1:
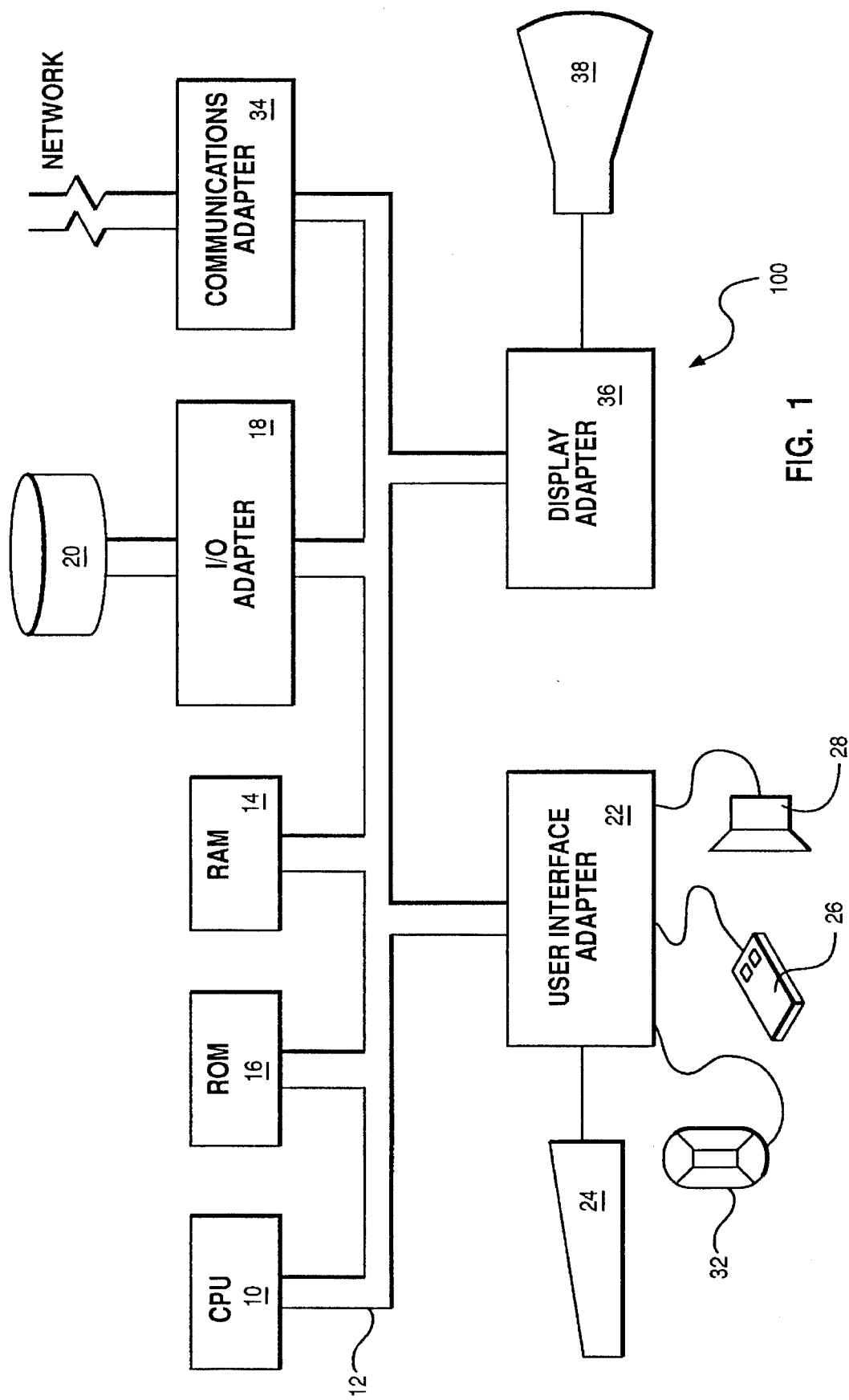
FIG. 1 illustrates a suitable representative hardware configuration in accordance with the present invention.

The present invention includes an apparatus and method for visually programming state information using a visual switch object. The present invention is preferably practiced in a suitable representative hardware configuration, such as the hardware configuration illustrated in FIG. 1.

Workstation 100 includes any suitable central processing unit 10 (e.g. the first circuitry), such as a conventional microprocessor, and a number of other units interconnected via system bus 12. Illustratively, workstation 100 includes Random Access Memory (RAM) 14, Read Only Memory (ROM) 16, display adapter 36 for connecting system bus 12 to display device 38, and I/O adapter 18 for connecting peripheral devices (e.g. disk and tape drives 20) to system bus 12. Workstation 100 further includes user interface adapter 22 for connecting keyboard 24, mouse 26, speaker 28, microphone 32, and/or other user interface devices, such as a touch screen device (not shown), to system bus 12. Communication adapter 34 connects workstation 100 to a data processing network.

The present invention includes a visual builder (VB) which resides within a machine-readable media (i.e., control element) to direct the operation of workstation 100. Any suitable machine-readable media may retain the VB, such as RAM 14, ROM 16, a CD-ROM, magnetic diskette, magnetic tape, or optical disk (the last four being located in disk and tape drives 20).

The VB contains data structures and detailed logic (described herein), which are transmitted as "signals" recognizable by workstation 100. In the preferred embodiment, the VB controls CPU 10 (e.g. the first circuitry) to permit visual programming of state information using an A/B switch object on display device 38. For ease in explanation, the following specification describes the VB as performing the various tasks of the present invention. In actuality, the VB merely controls and directs CPU 10 to perform those various tasks.

The following detailed logic defines an A/B switch object according to the preferred embodiment:

| (1)  | Class ABSwitch              | 'class definition'         |
|------|-----------------------------|----------------------------|
| (2)  | (private variables)         |                            |
|      | ...                         |                            |
| (3)  | switchValueA;               | 'current A value'          |
| (4)  | switchValueB;               | 'current B value'          |
| (5)  | currentValue;               | 'current output value'     |
|      | ...                         |                            |
| (6)  | (public methods)            |                            |
| (7)  | setAInput(value);           | 'set the current A value,  |
| (8)  | setBInput(value);           | 'set the current B value'  |
| (9)  | setSwitchSideA;             | 'set the switch to output the A value' |
| (10) | setSwitchSideB;             | 'set the switch to output the B value' |
| (11) | getCurrentValue(switchValue); | 'get the current switch value' |
|      | ...                         |                            |
| (12) | (method implementations)    |                            |
|      | ...                         |                            |
| (13) | ABSwitch::setAInput(value)  |                            |
| (14) |    switchValueA = value; |                  |
| (15) |    return;   |                            |

```
(16)    ABSwitch::setBInput(value)
(17)        switchValueB = value;
(18)        return;
(19)    ABSwitch::setSwitchSideA
(20)        currentValue = switchValueA;
(21)        return;
(22)    ABSwitch;;setSwitchSideB
(23)        currentValue = switchValueB;
(24)        return;
(25)    ABSwitch;;getCurrentValue
(26)        return currentValue;
        . . .
(27)    End ABSwitch;
```

At line 1 above, the class definition for the A/B switch object begins. The VB declares various private variables, which are variables that are not shared outside this class, at line 2. At lines 3, 4, and 5, the VB declares variables to hold the values of an A input (i.e. switchValueA), B input (i.e. switchValueB), and switch output (i.e. currentValue), respectively. At line 6, the VB defines various public methods, which are functions that are accessible by routines that use (e.g. call) the switch object. At lines 7 and 8, the VB defines methods that allow the switch values to be set. At lines 9 and 10, the VB defines methods that allow the output of the switch to be set from either of the two inputs. At line 11, the VB defines a method that allows a current output value to be obtained.

At line 12, the method implementations begin, which is the actual code that performs the functions of the methods. At line 13, the VB defines the method that sets the value for the A input. At line 14, the VB saves the value passed as a variable in switchValueA. At line 15, the method returns to the caller (i.e. control returns to the calling routine). At line 16, the VB defines the method that sets the value for the B input. At line 17, the VB saves the value passed as a variable in switchValueB. At line 18, the method returns to the caller. At line 19, the VB defines the method that sets the current output to switchValueA. At line 20, the VB sets the currentValue to switchValueA. At line 21, the method returns to the caller.

At line 22, the VB defines the method that sets the current output to switchValueB. At line 23, the VB sets the currentValue to switchValueB. At line 24, the method returns to the caller. At line 25, the VB defines the method that returns the current value to the caller. At line 26, the VB returns the currentValue to the caller. At line 27 the class definition is ended.

It should be obvious to one skilled in the art that additional 'switch sections' could be easily added through the use of additional variables and methods. For example, the addition of two more variables and two more methods would enable an A/B/C/D switch capable of retaining four state values.

Figure 2:
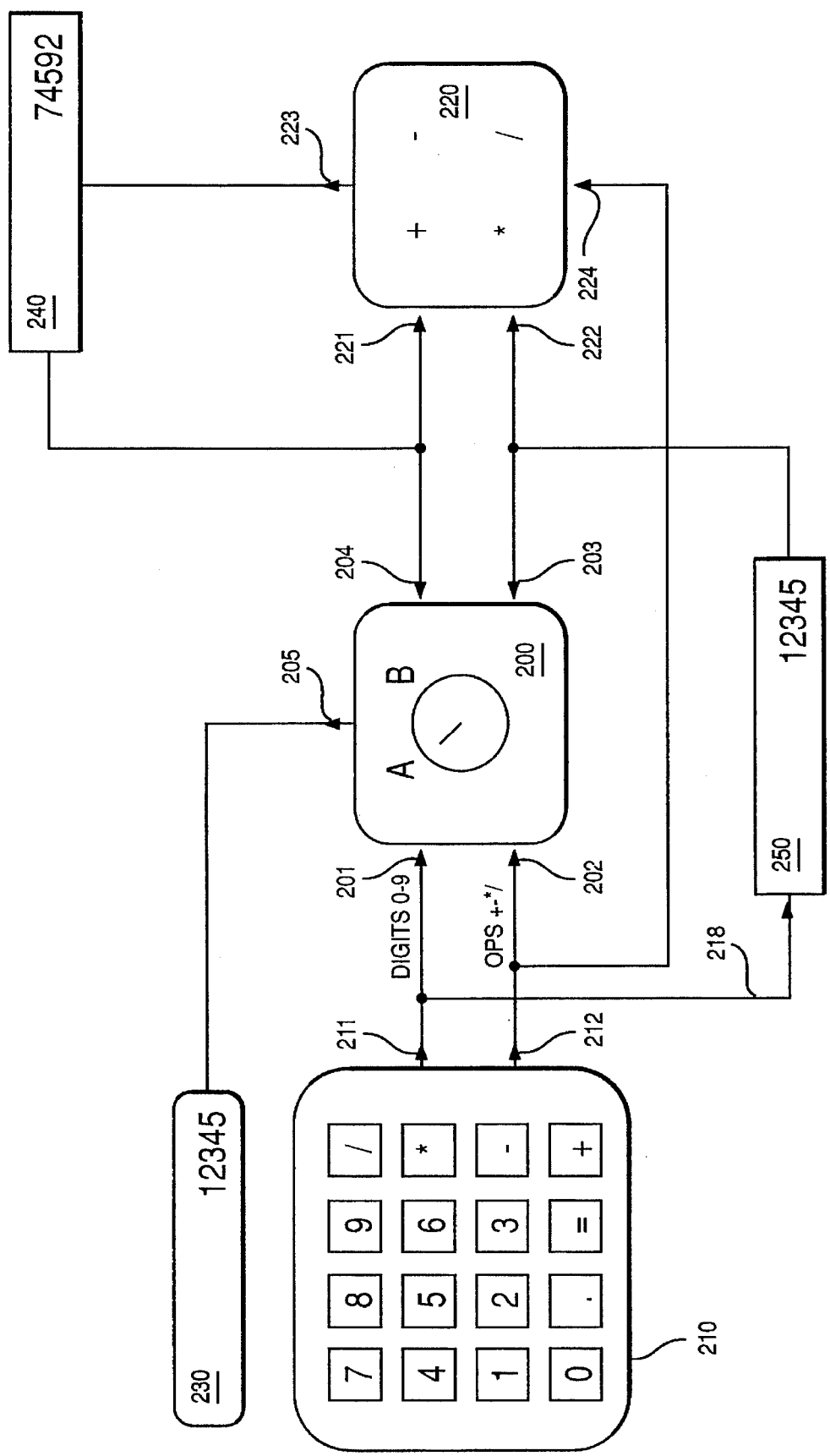
FIG. 2 illustrates one possible implementation of a calculator using a Visual Builder and an A/B switch object.

FIG. 2 illustrates one possible implementation of a calculator using the VB and the A/B switch described above. For purposes of illustration only, the VB links switch object 200 to keypad object 210, operator object 220, digit accumulator object 250, running total object 240, and display object 230. Visually linking objects is well known to those skilled in the art and need not be further described.

Display object 230 and keypad object 210 are the only components that will appear on display device 38 (see FIG. 1) at runtime. The remaining components are only visible on display device 38 while the user constructs the calculator. Display object 230 would typically be a text entry field, common in many conventional visual builders. The user could construct keypad object 210 from many push-buttons, also common in conventional visual builders.

Keypad object 210 has two outputs 211 and 212. Output 211 outputs one of the digits (0–9) when the user "presses" a digit key. The user may "press" a digit key by activating (e.g. clicking) any suitable pointing device, such as a mouse cursor (not shown). Output 212 outputs one of the operators (e.g. +,−,*,/) when the user presses one of the operator keys.

Switch object 200 has four inputs 201–204 and one output 205. Input 201 represents the setswitchSideA method described above. Input 202 represents the setSwitchSideB method, while input 204 represents the setBInput method. Input 203 represents the setAInput method, while output 205 represents the getCurrentValue method.

The user, through use of the VB, connects keypad output 211 to the ABSwitch setSwitchSideA method (i.e. input 201) such that when a digit key is pressed, the switch is set to output its A value. The A value is the value in digit accumulator 250 and is transmitted via the setAInput connection (i.e. input 203) on switch object 200. Connection 218 appends the keyed digit to the digit accumulator 250.

The VB connects keypad output 212 to the ABSwitch setSwitchSideB method (i.e. input 202), such that when a user presses an operator key, the VB sets switch object 200 to output its B value. The B value is the value in running total object 240 and is transmitted via the setBInput connection (i.e. input 204) on switch object 200. The output 205 of switch object 200 is connected to the display object 230 so that either the value in running total 240 or digit accumulator 250 is displayed, depending on which type of key was pressed.

An arithmetic calculator object 220 accepts inputs from digit accumulator object 250 via input connection 222 and the running total 240 via the input connection 221. Arithmetic calculator object 220 performs the operation entered by the user on keypad object 210, now supplied at input 224. The VB outputs the resulting value at output 223 to running total object 240.

Figure 3:
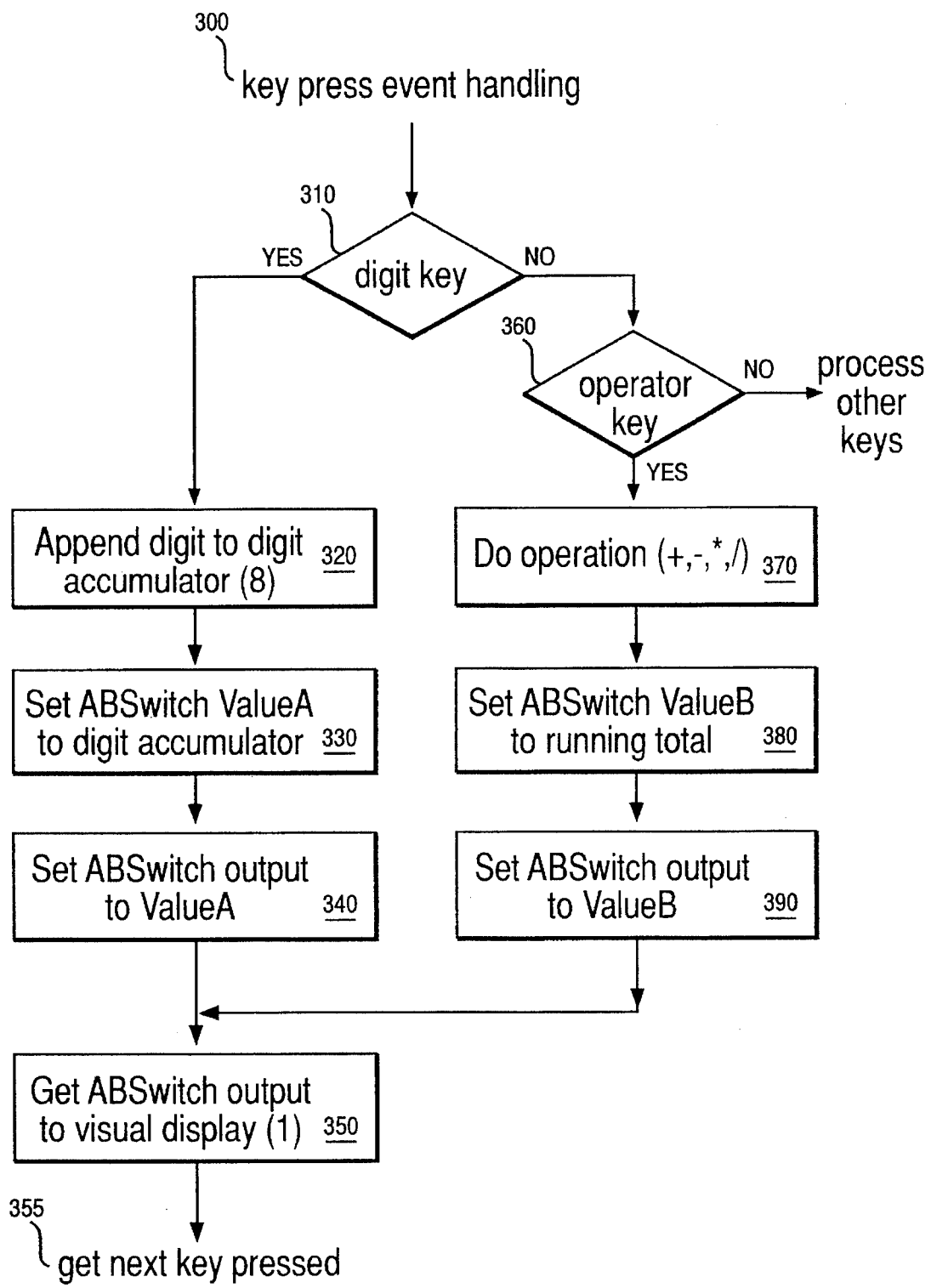
FIG. 3 illustrates a flowchart of the calculator shown in FIG. 2.

FIG. 3 illustrates a flowchart of the above described calculator. Referring to FIGS. 2 and 3, at 300, the VB detects a key press. At 310, the VB determines if the user pressed a digit key (0–9) from keypad object 210. If so, at 320, the VB appends the digit to digit accumulator object 250. At 330, the VB invokes the ABSwitch setAInputValue method using the value stored in digit accumulator 250 as the value parameter. At 340, the VB sets ABSwitch output 205 to ValueA (i.e. input 203). At 350, the VB invokes the ABSwitch getCurrentValue method to display the updated digit accumulator 250 on display object 230.

At 360, the VB determines if the user pressed an operator key (+,−,*,/) from keypad 210. If not, the VB processes other keys. If so, at 370, the operation would be carried out using the value stored in running total object 240 and the value stored in digit accumulator 250. At 380, the VB invokes the ABSwitch setBInputValue method using the value in running total object 240 as the value parameter. At 390, the VB sets output 205 of switch object 200 to input 204. At 350, the VB invokes the ABSwitch getCurrentValue method to display the value in running total object 240 on display object 230.

While the invention has been shown and described with reference to particular embodiments thereof, it will be understood by those skilled in the art that the foregoing and other changes in form and detail may be made therein without departing from the spirit and scope of the invention, which is defined only by the following claims.

I claim:

1. A computer-implemented method for visually programming on a computer display using a visual switch object in a visual programming development tool, the visual switch object having at least one first input to receive input from input devices, a plurality of second inputs to receive input from said switch object or applications connected to said switch object, and at least one output, comprising the steps of:

displaying said visual switch object on the computer display in the visual programming development tool; and in response to user controls, visually connecting on the computer display a visual activation object to said input of said switch object;

in response to activating said visual activation object by user controls, visually connecting said output of said switch object to a selected one of said second inputs such that information received on the selected one of said second inputs is received by said output.

2. The method according to claim 1 wherein said step of visually connecting said output to a selected one of said second inputs comprises the steps of:

visually linking a first object, having information stored therein, to one of said second inputs of said visual switch object; and visually linking a second object, having information stored therein, to another of said second inputs.

3. The method according to claim 2 wherein said step of visually connecting said output to a selected one of said second inputs in response to activating said visual activation object further comprises the step of:

in response to said visual activation object being activated by user controls, selectively transmitting through one of said second inputs the information stored in said first object to said output.

4. The method according to claim 3 wherein said step of visually connecting said output to a selected one of said second inputs in response to activating said visual activation object further comprises the steps of: visually linking a third object to another input; and in response to said third object being activated by user controls, selectively transmitting through one of said second inputs the information stored in said second object to said output.

5. The method according to claim 4 wherein said first object comprises an accumulator object and said second object comprises a running total object.

6. The method according to claim 5 wherein said visual activation object comprises digits of a keypad object and said third object comprises operator keys of said keypad object.

7. The method according to claim 1 further comprising the step of:

in response an activation on another input from user controls, visually connecting said output to another selected one of said second inputs, thereby transmitting information from the selected second input to the output.

8. A computer system, having at least processor, memory, and user controls, for visually programing information in a visual programing tool running on the computer system, comprising:

a display;

a visual switch object displayed on said display in said visual programming tool, said visual switch object comprising:

at least one first input to receive input from input devices;

plurality of second inputs to receive input from said switch object or applications connected to said switch object; and in response to an activation of a visual activation object, visually connected to said first input of said switch object, by said user controls, on the display visually connecting an output from said switch object or from applications connected to said switch object to to selected one of said second inputs, wherein information received on the selected one of said second inputs is transmitted to said output.

9. The system according to claim 8 wherein said means for visually connecting said output to a selected one of said second inputs comprises:

means for visually linking a first object having information stored therein to one of said second inputs; and means for visually linking a second object having information stored therein to another of said second inputs.

10. The system according to claim 9 wherein said means for visually connecting said output to a selected one of said second inputs in response to activating said visual activation object further comprises:

in response to said visual activation object being activated by user controls, means for selectively transmitting through one of said second inputs the information stored in said first object to said output.

11. The system according to claim 10 wherein said means for visually connecting said output to a selected one of said second inputs in response to activating said visual activation object further comprises:

means for visually linking a third object to another input; and in response to said third object being activated by user controls, means for selectively transmitting through one of said second inputs the information stored in said second object to said output.

12. The system according to claim 11 wherein said first object comprises an accumulator object and said second object comprises a running total object.

13. The system according to claim 12 wherein said visual activation object comprises digits of a keypad object and said third object comprises operator keys of said keypad object.

14. An article of manufacture comprising:

a computer usable medium having computer readable program code means embodied therein for causing a computer to visually program information on a computer display using a visual switch object in a visual programming development tool, the visual switch object having at least one input, a plurality of second inputs, and at least one output, the computer readable program code means said the article of manufacture comprising:

computer readable program code means for causing the computer to display said visual switch object on the computer display in the visual programming development tool; and computer readable program code means for causing the computer to visually connect said output to a selected one of said second inputs in response to an activation of said input by user controls, such that information received on the selected one of said second inputs is received by said output.

* * * * *